(12) United States Patent
Sakr et al.

(10) Patent No.: US 11,555,958 B2
(45) Date of Patent: Jan. 17, 2023

(54) NESTED ANTI-RESONANT NODELESS OPTICAL FIBER AND SUBSURFACE SYSTEM USING THE SAME

(71) Applicants: Saudi Arabian Oil Company, Dhahran (SA); University of Southampton, Southampton (GB)

(72) Inventors: Hesham Sakr, Southampton (GB); Hans Christian Hansen Mulvad, Southampton (GB); Shaif-ul Alam, Southampton (GB); Lin Xu, Chandlers Ford (GB); Callum Smith, Frederiksberg (DK); John Hayes, Fordingbridge (GB); David Richardson, Southampton (GB); Francesco Poletti, Southampton (GB); Damian Pablo San Roman Alerigi, Al-Khobar (SA); Sameeh Issa Batarseh, Dhahran Hills (SA)

(73) Assignees: SAUDI ARABIAN OIL COMPANY, Dhahran (SA); University of Southampton, Southampton (GB)

( * ) Notice: Subject to any disclaimer, the term of this patent is extended or adjusted under 35 U.S.C. 154(b) by 38 days.

(21) Appl. No.: 17/220,864

(22) Filed: Apr. 1, 2021

(65) Prior Publication Data

US 2022/0317369 A1 Oct. 6, 2022

(51) Int. Cl.
*G02B 6/032* (2006.01)

(52) U.S. Cl.
CPC .................. *G02B 6/032* (2013.01)

(58) Field of Classification Search
CPC .................................... G02B 6/032
See application file for complete search history.

(56) References Cited

U.S. PATENT DOCUMENTS

| 10,451,421 B2 * | 10/2019 | Sanders ............. G02B 6/02328 |
| 10,527,782 B2 * | 1/2020 | Lyngsøe ............. C03B 37/0122 |
| 11,249,250 B2 * | 2/2022 | Jasion ................ G02B 6/02357 |
| 2007/0009216 A1 | 1/2007 | Russell et al. |
| 2011/0243496 A1 | 10/2011 | Jones |
| 2012/0134012 A1 | 5/2012 | Guerin et al. |
| 2016/0209586 A1 | 7/2016 | Fokoua et al. |
| 2016/0338601 A1 | 11/2016 | Yang |
| 2017/0160467 A1 * | 6/2017 | Poletti ................ G02B 6/02328 |
| 2017/0370894 A1 | 12/2017 | Chiniforooshan et al. |

(Continued)

FOREIGN PATENT DOCUMENTS

| CN | 111458787 A | 7/2020 |
| WO | 2015185761 A1 | 12/2015 |

OTHER PUBLICATIONS

F. Poletti, "Nested antiresonant nodeless hollow core fiber," Optics Express, vol. 22, No. 20, pp. 23807-23828, 2014.

(Continued)

*Primary Examiner* — Ellen E Kim
(74) *Attorney, Agent, or Firm* — Leason Ellis LLP

(57) ABSTRACT

A nested anti-resonant nodeless hollow core fiber (NANF) enables transmission of multi-kilowatt, continuous wave (CW) light beams operating in wavelengths between 1050 nm and 1100 nm provided by single mode lasers. Such a NANF has little loss over kilometer ranges, and can be employed in long distance subsurface applications, such as in the petroleum industry.

5 Claims, 3 Drawing Sheets

(56) References Cited

U.S. PATENT DOCUMENTS

2018/0045041 A1* 2/2018 Stark .................. E21B 47/00
2020/0156987 A1  5/2020 Wheeler et al.
2020/0280164 A1* 9/2020 Almeida ............. H01S 3/083

OTHER PUBLICATIONS

Partial Europen search report in corresponding EP Application No. 22166149.9, dated Aug. 11, 2022; 13 pages.
MD. Selim Habib et al: "Low-loss hollow-core silica fibers with adjacent nested anti-resonant tubes", Optics Express, vol. 23, No. 13, Jun. 24, 2015 (Jun. 24, 2015), p. 17394, XP055402307, DOI: 10.1364/0E.23.017394; 13 pages.

* cited by examiner

NESTED ANTI-RESONANT NODELESS OPTICAL FIBER AND SUBSURFACE SYSTEM USING THE SAME

FIELD OF THE DISCLOSURE

The present disclosure relates generally to optical fibers, and, more particularly, to a nested anti-resonant nodeless hollow core optical fiber (NANF) and a subsurface system and method using such a NANF.

BACKGROUND OF THE DISCLOSURE

A nested anti-resonant nodeless hollow core fiber (NANF) is an optical fiber such that light is confined and guided within a hollow region of space defined using a glass structure. The hollow region can be a vacuum or filled with air. A light beam transmitted in the hollow region has only very weak interactions with the glass defining the optical fiber, and so the light beam can propagate with low loss. In some instances, a NANF can achieve transmission losses below 10% across multi-kilometer propagation. The physical principle for light confinement and guiding is optical anti-resonance, instead of total internal reflection.

As shown in FIG. 1, a NANF of the prior art, such as described in international application WO2015/185761, has a first tubular, cladding element 1 which defines an internal cladding surface 3. A plurality of second tubular elements 5 are also included which are arranged in a spaced symmetrical relation at the cladding surface 3 and together define a core 9 with a radius R from the center C of the NANF. A further plurality of third tubular elements 7 are each nested within a respective one of the second tubular elements 5. The nested ones of the second and third tubular elements 5, 7 provide nested tubular arrangements 11a-11f. In the prior art, the core radius R is typically less than 30 μm. Other parameters and dimensions of the NANF include a wall thickness t of each of the tubular elements 5, 7, a gap distance d between tubular elements 5, and a distance z between the portions of the tubular elements 5, 7 closest to the center C of the NANF.

NANFs of the prior art form a core surrounded with a negative curvature, such that nodes are pushed further away from an air-guided mode of the optical fiber. Such NANFs have been applied to optical data communications, low latency data transmission, radiation hardness, high power delivery, mid-IR gas spectroscopy, biomedical applications, and gyroscopes and temperature-insensitive fibers for delivery of precise frequency/time information.

SUMMARY OF THE DISCLOSURE

According to an embodiment consistent with the present disclosure, a NANF is configured to enable transmission of multi-kilowatt, continuous wave (CW) light beams operating in wavelengths between 1050 nm and 1100 nm which are provided by single mode lasers. Such a NANF has little loss over kilometer ranges, and so is appropriate to be employed in long distance subsurface applications, such as in the petroleum industry.

In one embodiment, an optical fiber comprises a first tubular member having an internal surface, a first wall thickness $t_1$, and an outer diameter D. The optical fiber also includes a plurality of second tubular members extending through the first tubular member and spaced apart about the internal surface. There is a minimum spacing d between adjacent second tubular members, with the second tubular members defining a core region having a radius R. Each second tubular member has a second wall thickness $t_2$. The optical fiber further includes a plurality of third tubular members, with each third tubular member nested in and extending through a respective second tubular member, and each third tubular member having a third wall thickness $t_3$. The arrangement of tubular members define a Nested Anti-resonant Nodeless hollow core Fiber (NANF) configured to confine and guide light for transmission through the core region by optical anti-resonance.

In the embodiment, the outer diameter D is greater than 200 μm, the core radius R is greater than 25 μm, and the spacing d is at least 2.5 μm. The transmitted light has a wavelength in the range between 1050 nm and 1100 nm and has a loss as low as 0.3 dB/km. The core region is a vacuum-filled core region or an air-filled core region.

In another embodiment, a method comprises providing an optical fiber having a first tubular member having an internal surface, a first wall thickness $t_1$, and an outer diameter D. The method also comprises providing a plurality of second tubular members extending through the first tubular member and spaced apart about the internal surface, with a minimum spacing d between adjacent second tubular members, with the second tubular members defining a core region having a radius R, and each second tubular member having a second wall thickness $t_2$. The method further comprises providing a plurality of third tubular members, with each third tubular member nested in and extending through a respective second tubular member, and each third tubular member having a third wall thickness $t_3$, with the arrangement of tubular members defining a Nested Anti-resonant Nodeless hollow core Fiber (NANF) configured to confine and guide light for transmission through the core region by optical anti-resonance. The method then transmits light through the core region using the optical anti-resonance.

In the method, the outer diameter D is greater than 200 μm, the core radius R is greater than 25 μm, and the spacing d is at least 2.5 μm. The transmitted light has a wavelength in the range between 1050 nm and 1100 nm and has a loss of 0.3 dB/km or higher. The core region is a vacuum-filled core region or an air-filled core region.

In a further embodiment, a system comprises a laser, an optical fiber, a receiving assembly, in-coupling optics, and out-coupling optics. The in-coupling optics couple the laser to the optical fiber. The out-coupling optics couple the optical fiber to the receiving assembly and are configured to transmit light from the laser to the receiving assembly. The optical fiber in the system comprises a first tubular member having an internal surface, a first wall thickness $t_1$, and an outer diameter D. The optical fiber also has a plurality of second tubular members extending through the first tubular member and spaced apart about the internal surface, with a minimum spacing d between adjacent second tubular members, with the second tubular members defining a core region having a radius R, and each second tubular member having a second wall thickness $t_2$. The optical fiber further includes a plurality of third tubular members, with each third tubular member nested in and extending through a respective second tubular member, and each third tubular member having a third wall thickness $t_3$. The arrangement of tubular members define a Nested Anti-resonant Nodeless hollow core Fiber (NANF) configured to confine and guide light for transmission through the core region by optical anti-resonance.

In the system, the outer diameter D of the optical fiber is greater than 200 μm, the core radius R is greater than 25 μm, and the spacing d is between 2 and 5 μm. The light has a wavelength in the range between 1050 nm and 1100 nm. The light has a loss of 0.3 dB/km between the laser and the receiving assembly.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a nested anti-resonant nodeless hollow core optical fiber (NANF) and a subsurface system and method using such a NANF. Referring to the cross-sectional view in FIG. 2, an optical fiber 100 is configured as a NANF. The optical fiber 100 comprises a first tubular member 102. The first tubular member 102 can be a cladding element composed of glass. The first tubular member 102 has an internal surface 104 and an outer surface 106 with a first wall thickness $t_1$. In one example embodiment, the thickness $t_1$ is between 300 nm and 1000 nm. In another example embodiment, the thickness $t_1$ is between 700 nm and 900 nm. In a further example embodiment, the thickness $t_1$ is 775 nm±25 nm.

Figure 1:
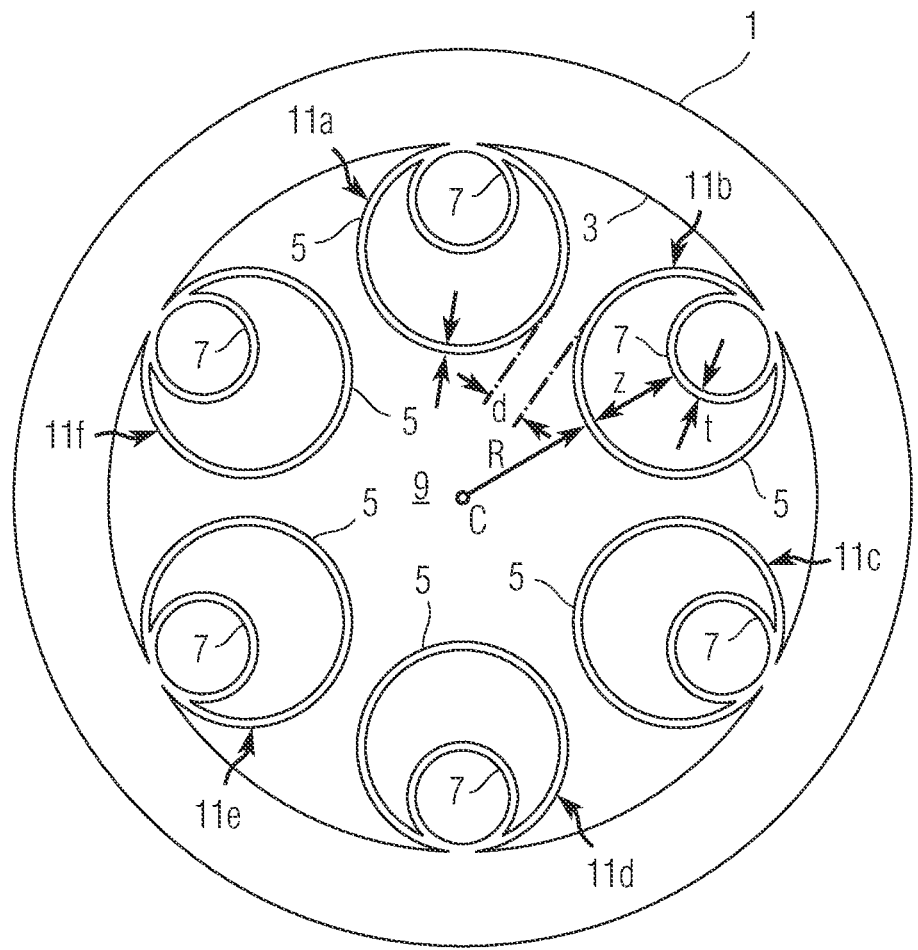
FIG. 1 is a cross-sectional view of a NANF in the prior art.
Figure 2:
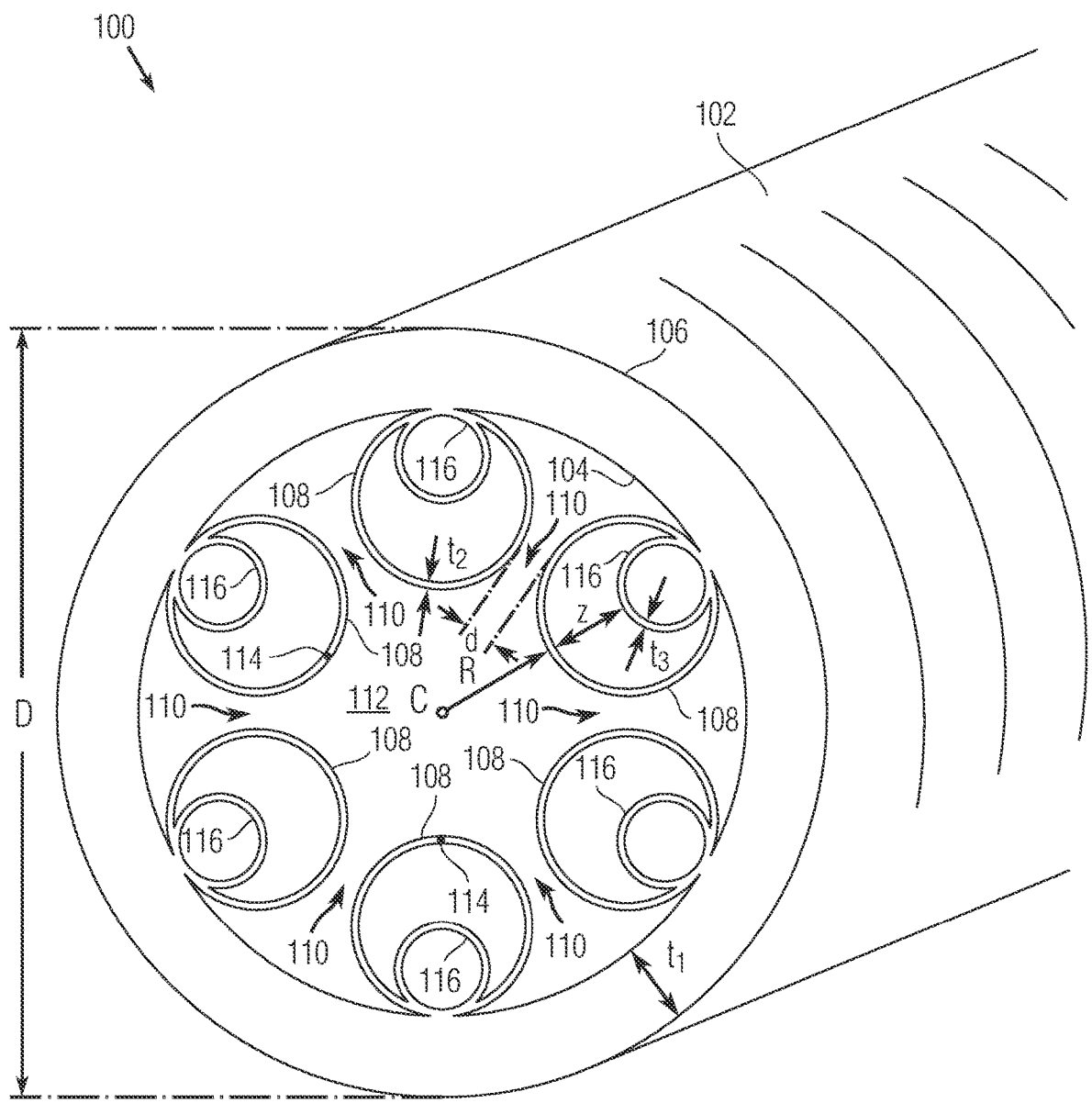
FIG. 2 is a cross-sectional view of a NANF according to an embodiment.

As shown in FIG. 2, the first tubular member 102 has an outer diameter D. In one example embodiment, the outer diameter D can be at least 300 µm. In another example embodiment, the outer diameter D can be at least 400 µm. In a further example embodiment, the outer diameter D is between 400 µm and 500 µm.

The optical fiber 100 can be surrounded by coatings disposed on the outer surface 106. In an example embodiment, coatings with a low Young's modulus are used. The coatings can include materials commercially available from LUVANTIX. Alternatively, the coatings can include materials commercially available from FOSPIA. The coatings are employed to minimize microbending loss. A low-index coating has a first, soft layer with a low Young's Modulus and a low glass transition temperature Tg. The low-index coating has a second, hard layer with a high Young's Modulus. In an example embodiment, both of the first and second layers have a refractive index lower than about 1.445.

The optical fiber 100 includes a plurality of second tubular members 108 which extend through the first tubular member 102 and are spaced apart about the inner periphery of the internal surface 104. Each second tubular member has a second wall thickness $t_2$. The second wall thickness $t_2$ can be in the range from 600 nm to 1,000 nm. A gap 110 with a minimum spacing d is between adjacent second tubular members 108. In one example embodiment, the minimum spacing d can be as small as 2 µm, but up to 5 µm gap spacing can be used. In another example embodiment, the minimum spacing d is a gap of $4t_2 \pm 2t_2$. The second tubular members 108 define a core region 112 within the interior of the first tubular member 102. The core region 112 is hollow. In an embodiment, the core region 112 is filled with air. In another embodiment, the core region 112 is a vacuum.

The core region 112 is centered about the longitudinal axis C of the first tubular member 102. The core region 112 has a core radius R extending from the longitudinal axis C to a point 114 on each second tubular member 108 which is closest to the longitudinal axis C. In one example embodiment, the core radius R can be in the range from 25 µm to 60 µm, depending on the outer diameter D of the fiber 100 and on the coating used to reduced microbending.

The optical fiber 100 also includes a plurality of third tubular members 116, with each third tubular member 116 nested in and extending through a respective second tubular member 108. Each third tubular member 116 has a third wall thickness $t_3$ which can be in the range from 600 nm to 1,000 nm. In an example embodiment, the wall thicknesses $t_2$, $t_3$ can be equal. Referring again to FIG. 2, a distance z is measured between the portions of the tubular elements 112, 116 closest to the longitudinal axis C of the optical fiber 100. In an example embodiment, the distance z is 0.9 times the core radius R, such that the ratio z/R is 0.9 for the optical fiber 100. Accordingly, for the optical fiber 100, z is in the range of 27 µm to 45 µm.

Such an arrangement of tubular members 102, 108, 116 defines a NANF configured to confine and guide light for transmission through the core region 112 by optical anti-resonance. When the light has a wavelength in the range between 1,050 nm and 1,100 nm, and when the optical fiber 100 has the dimensions described herein, the optical fiber 100 can have a signal loss on the order of 0.3 dB/km. The low signal loss of 0.3 dB/km is due, in part, to the outer diameter D being greater than 300 µm while the core radius R is in the range from 25 µm to 50 µm, and the gap 110 is maintained with a minimum spacing d of 2.7 µm. Accordingly, the tubular members 102, 108, 116 are configured and dimensioned to conform to these values of the outer diameter D, core radius R, and minimum spacing d. The dimensions of the optical fiber 100 provide a core surrounded with a negative curvature, such that nodes are pushed further away from or entirely eliminated from an air-guided mode of the optical fiber 100. By pushing away or eliminating the nodes that might form at the contact point between tubes, the microstructured region 112 becomes nodeless. The absence of glass nodes around the core region 112 helps decreasing the optical loss of the fiber 112, and therefore allows for high energy light beams greater than 1 kW and low signal loss of 0.3 dB/km to be transmitted by the optical fiber 100.

Figure 3:
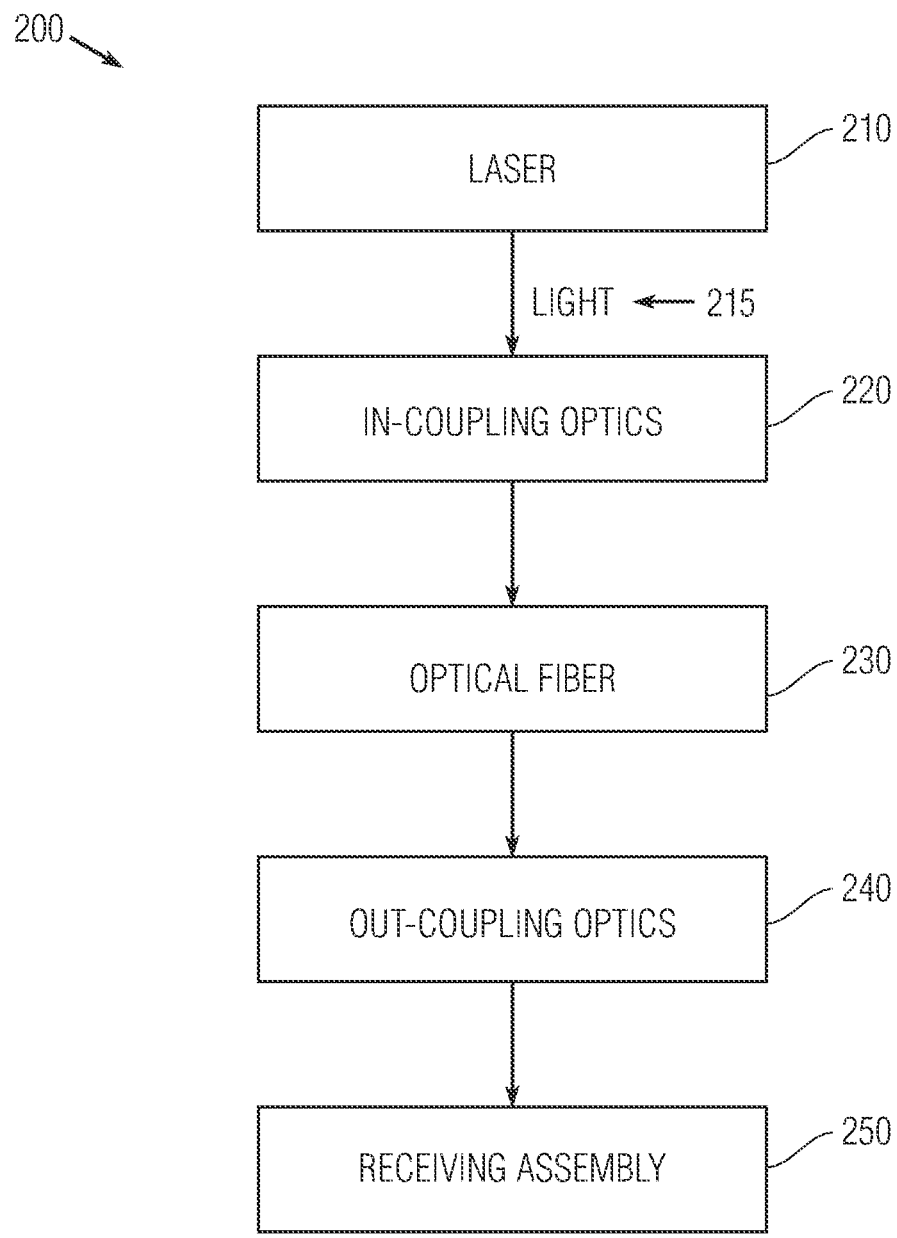
FIG. 3 is a schematic of a system according to an embodiment.

The low signal loss of 0.3 dB/km of the optical fiber 100, acting as a NANF, can be utilized in long distance applications. For example, a system 200 shown in FIG. 3 comprises a laser 210 emitting light 215 to in-coupling optics 220. The in-coupling optics 220 couple the laser 210 to an optical fiber 230 as described above in connection with the optical fiber 100 in FIG. 2. The light 215 transmitted through the optical fiber 230 is conveyed to out-coupling optics 240 which couple the optical fiber 230 to a receiving assembly 250. Thus, the system 200 is configured to transmit the light 215 from the laser 210 to the receiving assembly 250. The receiving assembly 250 can have a subsurface depth greater than 10,000 ft. In particular, the receiving assembly 250 can be a subsystem requiring high power laser beams with low loss delivery for subsurface oil and gas applications, such as in the petroleum industry. The laser 210 in the system 200 can provide a beam of light 215 with high output power, for example, greater than 1 kW. With such low losses of 0.3 dB/km provided by the NANF of FIG. 2, the high output power is conveyed efficiently by a high power laser beam to such subsurface applications.

In addition, the system 200 can include a downhole cabling assembly, at least one additional fiber, an opto-mechanical bottom hole assembly (oBHA), and at least one sensor, with the system 200 configured to perform various applications of a beam of light 215 from the laser 210. The applications of the beam of light 215 can include perforation, spallating, melting, evaporating, and heating subsurface matter. The applications of the beam of light 215 can also include welding, cutting, heating, evaporating, and melting metallic or non-metallic materials in the subsurface environment. The downhole cabling assembly protects the optical fiber 100 from the subsurface environment. The downhole cabling assembly can include a hollow tube of carbon, T-95 steel, Hastelloy, or other composites that are resistant to corrosion. The at least one additional fiber can include few-mode, multi-mode, and single-mode fibers configured to perform distributed temperature sensing, strain sensing, shape-sensing, and acoustic sensing fiber assembly provides information about macro-bending of the downhole optical fiber cable. The distributed temperature fiber provides information about the temperature of the environment. The distributed acoustic fiber is used to acquire information about the flow of material around the optical cable.

The oBHA can include at least one of refractive and diffractive optics or optomechanics configured to control the beam of light 215, to modify the transversal beam profile, to focus or de-focus the beam, and to stir the beam to a desired target in the subsurface environment. The plurality of sensors can be included in the oBHA to characterize the beam profile, to measure its spectral content and distribution, and to measure the overall power of the beam. The system 200 can also include a beam splitter. The beam splitter can be a 90/10 beam splitter in combination with at least one filter to achieve beam sampling of the beam of light 215.

In another embodiment, a method comprises providing an optical fiber having a first tubular member having an internal surface, a first wall thickness $t_1$, and an outer diameter D. The method also includes providing a plurality of second tubular members extending through the first tubular member and spaced apart about the internal surface, with a minimum spacing d between adjacent second tubular members, with the second tubular members defining a core region having a radius R, and each second tubular member having a second wall thickness $t_2$. The method further includes providing a plurality of third tubular members, with each third tubular member nested in and extending through a respective second tubular member, and each third tubular member having a third wall thickness $t_3$, with the arrangement of tubular members defining a Nested Anti-resonant Nodeless hollow core Fiber (NANF) configured to confine and guide light for transmission through the core region by optical anti-resonance. Accordingly, the method includes transmitting the light through the core region using the optical anti-resonance.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An optical fiber, comprising:
a first tubular member having an internal surface, a first wall thickness $t_1$, and an outer diameter D greater than 300 µm;
a plurality of second tubular members extending through the first tubular member and spaced apart about the internal surface, with a spacing d of 2.7 µm between adjacent second tubular members, with the second tubular members defining a core region having a radius R in the range of 25 µm to 50 µm, and each second tubular member having a second wall thickness $t_2$; and
a plurality of third tubular members, with each third tubular member nested in and extending through a respective second tubular member, and each third tubular member having a third wall thickness $t_3$,
wherein the arrangement of tubular members define a Nested Anti-resonant Nodeless hollow core Fiber (NANF) configured to confine and guide light for transmission through the core region by optical anti-resonance, and
wherein when the light has a wavelength in the range between 1050 nm and 1100 nm, the light has a loss between 0.3 dB/km and 1.0 dB/km.

2. The optical fiber of claim 1, wherein the core region is selected from the group consisting of: a vacuum-filled core region and an air-filled core region.

3. A method, comprising:
providing an optical fiber having a first tubular member having an internal surface, a first wall thickness $t_1$, and an outer diameter D greater than 300 µm;
providing a plurality of second tubular members extending through the first tubular member and spaced apart about the internal surface, with a spacing d of 2.7 µm between adjacent second tubular members, with the second tubular members defining a core region having a radius R in the range of 25 µm to 50 µm, and each second tubular member having a second wall thickness $t_2$;
providing a plurality of third tubular members, with each third tubular member nested in and extending through a respective second tubular member, and each third tubular member having a third wall thickness $t_3$, with the arrangement of tubular members defining a Nested Anti-resonant Nodeless hollow core Fiber (NANF) configured to confine and guide light for transmission through the core region by optical anti-resonance; and
transmitting the light through the core region using the optical anti-resonance,
wherein when the light has a wavelength in the range between 1050 nm and 1100 nm, the light has a loss between 0.3 dB/km and 1.0 dB/km.

4. The method of claim 3, wherein the core region is selected from the group consisting of: a vacuum-filled core region and an air-filled core region.

5. A system, comprising:
a laser configured to emit a beam of light;
an optical fiber;
a receiving assembly;
in-coupling optics coupling the laser to the optical fiber; and
out-coupling optics coupling the optical fiber to the receiving assembly and configured to transmit light from the optical fiber to the receiving assembly;
a downhole cabling assembly configured to protect the optical fiber from a subsurface environment;
an additional fiber configured to perform at least one of distributed temperature, strain, and acoustic sensing;
an opto-mechanical bottom hole assembly (oBHA); and
at least one sensor included within the oBHA;
wherein the optical fiber comprises:
a first tubular member having an internal surface, a first wall thickness $t_1$, and an outer diameter D greater than 300 µm;
a plurality of second tubular members extending through the first tubular member and spaced apart about the internal surface, with a spacing d of 2.7 µm between adjacent second tubular members, with the second tubular members defining a core region having a radius R in the range of 25 µm to 50 µm, and each second tubular member having a second wall thickness $t_2$; and
a plurality of third tubular members, with each third tubular member nested in and extending through a respective second tubular member, and each third tubular member having a third wall thickness $t_3$,
wherein the arrangement of tubular members define a Nested Anti-resonant Nodeless hollow core Fiber (NANF) configured to confine and guide light for transmission through the core region by optical anti-resonance,
wherein when the beam of light has a wavelength in the range between 1050 nm and 1100 nm, the beam of light has a loss between 0.3 dB/km and 1.0 dB/km between the laser and the receiving assembly, and
wherein the beam of light can perform an application selected from the group consisting of: perforating, spallating, melting, evaporating, heating, welding, and cutting materials.

* * * * *